(12) United States Patent
Kim et al.

(10) Patent No.: US 8,416,672 B2
(45) Date of Patent: Apr. 9, 2013

(54) OPTICAL PICKUP, PHOTODETECTOR, AND DRIVE ADOPTING THE OPTICAL PICKUP

(75) Inventors: Ui-yol Kim, Suwon-si (KR); Yong-jae Lee, Suwon-si (KR); Pyong-yong Seong, Seoul (KR); Hong-kuk Kim, Seoul (KR)

(73) Assignee: Toshiba Samsung Storage Technology Korea Corporation, Suwon-si (KR)

( * ) Notice: Subject to any disclaimer, the term of this patent is extended or adjusted under 35 U.S.C. 154(b) by 17 days.

(21) Appl. No.: 12/963,785

(22) Filed: Dec. 9, 2010

(65) Prior Publication Data

US 2011/0141869 A1 Jun. 16, 2011

(30) Foreign Application Priority Data

Dec. 11, 2009 (KR) .................. 10-2009-0123390

(51) Int. Cl.
*G11B 7/13* (2012.01)
(52) U.S. Cl.
USPC ............... 369/124.01; 369/44.41; 369/112.01
(58) Field of Classification Search ............ 369/112.01, 369/44.41, 124.12, 53.27, 124.01
See application file for complete search history.

(56) References Cited

U.S. PATENT DOCUMENTS

| | | | | |
|---|---|---|---|---|
| 5,627,813 A | * | 5/1997 | Miyashita | 369/116 |
| 6,480,456 B1 | * | 11/2002 | Kawamura et al. | 369/120 |
| 8,238,220 B2 | * | 8/2012 | Sato et al. | 369/112.23 |
| 2002/0031062 A1 | * | 3/2002 | Izumi et al. | 369/44.41 |
| 2002/0041542 A1 | * | 4/2002 | Sano et al. | 369/44.23 |
| 2005/0237902 A1 | * | 10/2005 | Nishiwaki et al. | 369/112.12 |
| 2006/0077550 A1 | * | 4/2006 | Sano et al. | 359/558 |
| 2006/0262708 A1 | * | 11/2006 | Watabe et al. | 369/112.01 |
| 2007/0064574 A1 | * | 3/2007 | Komma et al. | 369/112.04 |
| 2008/0002540 A1 | * | 1/2008 | Hiramatsu et al. | 369/44.37 |

FOREIGN PATENT DOCUMENTS

| | | |
|---|---|---|
| JP | 2000-339738 | 12/2000 |
| JP | 2001-209957 | 8/2001 |

OTHER PUBLICATIONS

Korean Office Acton issued Jan. 14, 2013 in counterpart Korean Patent Application No. 10-2009-0123390 (3 pages, in Korean).

* cited by examiner

*Primary Examiner* — Thomas Alunkal
(74) *Attorney, Agent, or Firm* — NSIP Law

(57) ABSTRACT

An optical pickup, photodetector, and optical drive adopting the optical pickup are provided. The optical pickup may include a light emitting system having a plurality of light sources corresponding to a plurality of mediums a light receiving system including a photodetector for converting light reflected from a medium into an electrical signal. The photodetector may include first and second light receiving sensors corresponding to the plurality of mediums, each of the first and second light receiving sensors comprising a plurality of regions, each region comprising a plurality of sectors. The plurality of regions of the first and second light receiving sensors may include shared sectors that are shared by the first and second light receiving sensors and exclusive sectors that are exclusively used in the first light receiving sensor or the second light receiving sensor.

18 Claims, 6 Drawing Sheets

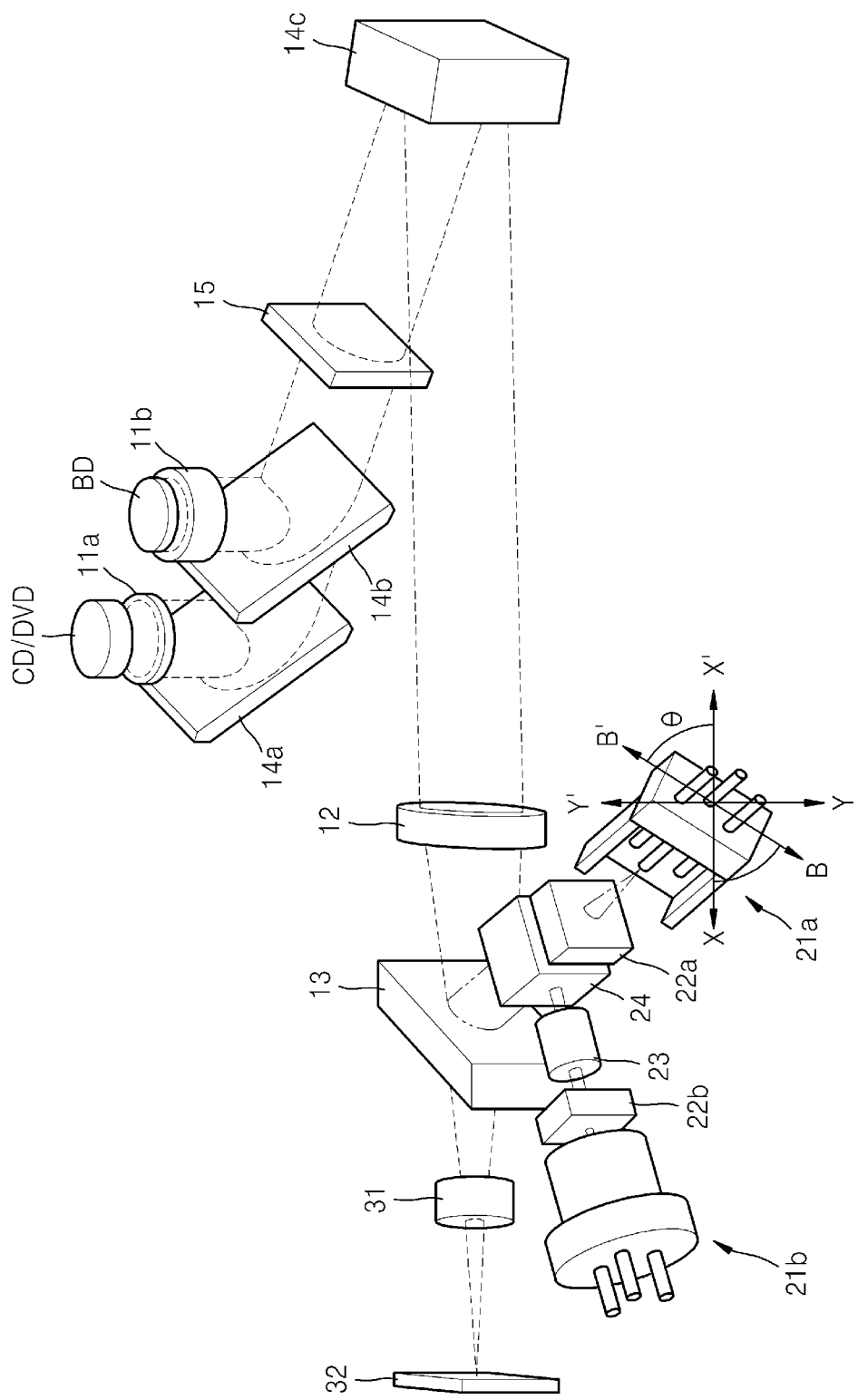

OPTICAL PICKUP, PHOTODETECTOR, AND DRIVE ADOPTING THE OPTICAL PICKUP

CROSS-REFERENCE TO RELATED PATENT APPLICATION(S)

This application claims the benefit under 35 U.S.C. §119(a) of Korean Patent Application No. 10-2009-0123390, filed on Dec. 11, 2009, in the Korean Intellectual Property Office, the disclosure of which is incorporated herein by reference for all purposes.

BACKGROUND

1. Field

The following description relates to an optical pickup and an optical drive adopting the optical pickup.

2. Description of the Related Art

A 3-beam type optical pickup may obtain a single main beam and two sub beams by using a diffraction element disposed between a beam splitter and a light source. A light receiving sensor that converts light reflected from a medium into an electrical signal may include a main beam region that the main beam reaches and two sub beam regions that the sub beams reach and that are disposed at opposite sides of the main beam region.

A photodetector of an optical pickup used for compact discs (CDs), Blu-ray Discs (BDs), and digital versatile discs (DVDs) may include a light receiving sensor for CDs and a light receiving sensor for BDs/DVDs, which are generally integrated in a single substrate. In addition, a light source for emitting a short wavelength light for BDs and a twin light source for CDs/DVDs may be separately disposed as light sources. The twin light source has a structure in which an emission chip for CDs and an emission chip for DVDs are integrated on a single base (wafer or substrate). The base is disposed to lean with respect to the plane of a medium or the body of the optical pickup. The base leans in such a way that the light receiving sensor for CDs and the light receiving sensor for BDs/DVDs do not overlap with each other. If the gradient of the base decreases, both of the light receiving sensors may be moved closer to each other. On the other hand, if the gradient of the base increases, both of the light receiving sensors may be moved away from each other. However, the gradient of the base may not be increased in an ultra-thin optical pickup having a thickness of 4 mm or less. If the gradient of the base is less than a predetermined level, both of the light receiving sensors overlap each other, which may prevent design of light receiving sensors corresponding to each medium.

FIG. 1 illustrates a schematic structure of an example of a conventional optical pickup compatibly used with a plurality of mediums such as CDs, BDs, and DVDs.

The optical pickup shown in FIG. 1 includes a light transport system (or transmission system) 10 that directly corresponds to a medium 1, a light emitting system 20 that supplies light for reproducing information from and/or writing information onto the medium 1, and a light receiving system 30 that receives light reflected from the medium 1 and generates an electrical reproduction signal to reproduce information.

The light transport system 10 includes an objective lens assembly 11 that corresponds to the medium 1, a first beam splitter 13 having a plate-shape structure, and a collimating lens 12 disposed between the objective lens assembly 11 and the first beam splitter 13. The objective lens assembly 11 includes first and second objective lenses 11a and 11b corresponding to a plurality of mediums. The first objective lens 11a corresponds to CDs and DVDs, and the second objective lens 11b corresponds to BDs. The first and second objective lenses 11a and 11b are aligned to be parallel to the medium 1 and share an optical axis that is perpendicular to both the medium 1 and an optical axis x1 of the transmission system 10. An optical path including the optical axis x1 and the optical axis of the objective lens assembly 11 is refracted by an optical path changing mirror 14. That is, the optical path changing mirror 14 is disposed between the collimating lens 12 disposed on the optical axis x1 parallel to the medium 1 and the first and second objective lenses 11a and 11b disposed on the optical axis perpendicular to the medium 1. The objective lens assembly 11 makes a reciprocating motion so that the first objective lens 11a or the second objective lens 11b can be disposed on the optical axis of the transmission system 10 according to the type of the medium.

The first beam splitter 13 reflects light emitted from the light emitting system 20 in a direction that allows the light to be incident on the medium 1 and light reflected from the medium 1 is transmitted through the first beam splitter 13 and is incident on the light receiving system 30.

The light receiving system 30 includes a photodetector 32 on which the light reflected from the medium 1 is incident and a sensing lens 31 condenses the light on the photodetector 32 to an appropriate size.

The light emitting system 20 includes a plurality of light sources corresponding to the medium 1, for example, a first light source 21a for CDs/DVDs and a second light source 21b for BDs. The first and second light sources 21a and 21b irradiate light toward first and second incidence surfaces 24a and 24b, respectively, of a cubical second beam splitter 24. A coupling lens 23 is disposed between the second light source 21b and the second beam splitter 24 to control an optical magnification, i.e., a defocused amount of a proceeding light. The second beam splitter 24, which receives the light from the second light source 21b, has the two incidence surfaces 24a and 24b, which are adjacent, and adjacent second and first emission surfaces 24c and 24d. Most of light that is incident on the two incidence surfaces 24a and 24b from the first and second light sources 21a and 21b proceeds toward the first beam splitter 13 via the first emission surface 24d. A first diffraction element (grating) 22a for CDs/DVDs and a second diffraction element (grating) 22b for BDs each generate a main beam and sub beams (first diffraction light), and are respectively disposed between the cubical second beam splitter 24 and each of the first and second light sources 21a and 21b. As well-known in the art, intervals between a main beam and a sub beam vary according to grating intervals of the first and second diffraction elements 22a and 22b. Meanwhile, a monitor photodetector 25 is disposed in front of the second emission surface 24c of the second beam splitter 24 to detect light emitted from the second beam splitter 24. The monitor photodetector 25 may be disposed at a side of the first beam splitter 13.

Meanwhile, the coupling lens 23 is disposed between the second light source 21b and the second incidence surface 24b to adjust an optical distance between the second light source 21b and the medium 1 so that light from the second light source 21b may be incident on the collimating lens 12 at an appropriate angle.

SUMMARY

In one general aspect, there is provided an optical pickup, including: a light emitting system including a plurality of light sources corresponding to a plurality of mediums, and a light receiving system including a photodetector configured to convert light reflected from a medium into an electrical signal, the photodetector including first and second light receiving sensors corresponding to the plurality of mediums, each of the first and second light receiving sensors including a plurality of regions, each region including a plurality of sectors, the plurality of regions of the first and second light receiving sensors including: shared sectors configured to be shared by the first and second light receiving sensors, and exclusive sectors configured to be exclusively used in the first light receiving sensor or the second light receiving sensor.

The optical pickup may further include that the first and second light receiving sensors respectively include: a main region configured to receive a main beam from one of the light sources, and sub regions configured to receive sub beams, the sub regions being disposed at opposite sides of the main region.

The optical pickup may further include that: the first and second light receiving sensors respectively include three regions, and two of the three regions include the shared sectors and exclusive sectors.

The optical pickup may further include that: each of the first and second light receiving sensors includes a main region and first and second sub regions at opposite sides of the main region, the main region and the second sub region of the first light receiving sensor and the first sub region and the main region of the second light receiving sensor include the shared sectors, and the first sub region of the first light receiving sensor and the second sub region of the second light receiving sensor are configured to be exclusively used for different mediums.

The optical pickup may further include that the photodetector includes: two adjacent regions of six sectors including the shared sectors, and two regions of four sectors that are disposed at opposite sides of the two light receiving regions and that respectively belong to the first and second light receiving sensors.

In another general aspect, there is provided an optical drive, including: an optical pickup including: an optical system, and a mechanical system configured to:

sustain the optical system, and perform focusing and tracking operations, an information processor including an encoder/decoder, the information processor configured to process an electrical signal received from the optical pickup, the optical pickup including: a light emitting system including a plurality of light sources corresponding to a plurality of mediums, and a light receiving system including a photodetector configured to convert light reflected from a medium into an electrical signal, the photodetector including first and second light receiving sensors corresponding to the plurality of mediums, each of the first and second light receiving sensors including a plurality of regions, each region including a plurality of sectors, the plurality of regions of the first and second light receiving sensors including: shared sectors configured to be shared by the first and second light receiving sensors, and exclusive sectors configured to be exclusively used in the first light receiving sensor or the second light receiving sensor, and a servo unit connected to the mechanical system.

The optical drive may further include that the first and second light receiving sensors respectively include: a main region configured to receive a main beam from one of the light sources, and sub regions configured to receive sub beams, the sub regions being disposed at opposite sides of the main region.

The optical drive may further include that: the first and second light receiving sensors respectively include three regions, and two of the three regions include the shared sectors and exclusive sectors.

The optical drive may further include that: each of the first and second light receiving sensors includes a main region and first and second sub regions at opposite sides of the main region, the main region and the second sub region of the first light receiving sensor and the first sub region and the main region of the second light receiving sensor include the shared sectors, and the first sub region of the first light receiving sensor and the second sub region of the second light receiving sensor are configured to be exclusively used for different mediums.

The optical drive may further include that the photodetector includes: two adjacent regions of six sectors including the shared sectors, and two regions of four sectors that are disposed at opposite sides of the two light receiving regions and that respectively belong to the first and second light receiving sensors.

In another general aspect, there is provided a photodetector, including: a first light receiving sensor a second light receiving sensor corresponding to a plurality of mediums, each of the first and second light receiving sensors including a plurality of regions, each region including a plurality of sectors, the plurality of regions of the first and second light receiving sensors including: shared sectors configured to be shared by the first and second light receiving sensors, and exclusive sectors configured to be exclusively used in the first light receiving sensor or the second light receiving sensor.

The photodetector may further include that the first and second light receiving sensors respectively include: a main region configured to receive a main beam from one of the light sources, and sub regions configured to receive sub beams, the sub regions being disposed at opposite sides of the main region.

The photodetector may further include that: the first and second light receiving sensors respectively include three regions, and two of the three regions include the shared sectors and exclusive sectors.

The photodetector may further include that: each of the first and second light receiving sensors includes a main region and first and second sub regions at opposite sides of the main region, the main region and the second sub region of the first light receiving sensor and the first sub region and the main region of the second light receiving sensor include the shared sectors, and the first sub region of the first light receiving sensor and the second sub region of the second light receiving sensor are configured to be exclusively used for different mediums.

The photodetector may further include that the photodetector includes: two adjacent regions of six sectors including the shared sectors, and two regions of four sectors that are disposed at opposite sides of the two light receiving regions and that respectively belong to the first and second light receiving sensors.

Other features and aspects may be apparent from the following detailed description, the drawings, and the claims.

BRIEF DESCRIPTION OF THE DRAWINGS

FIG. 4 is a diagram illustrating a three-dimensional view of examples of main components of an optical pickup.

Figure 1:
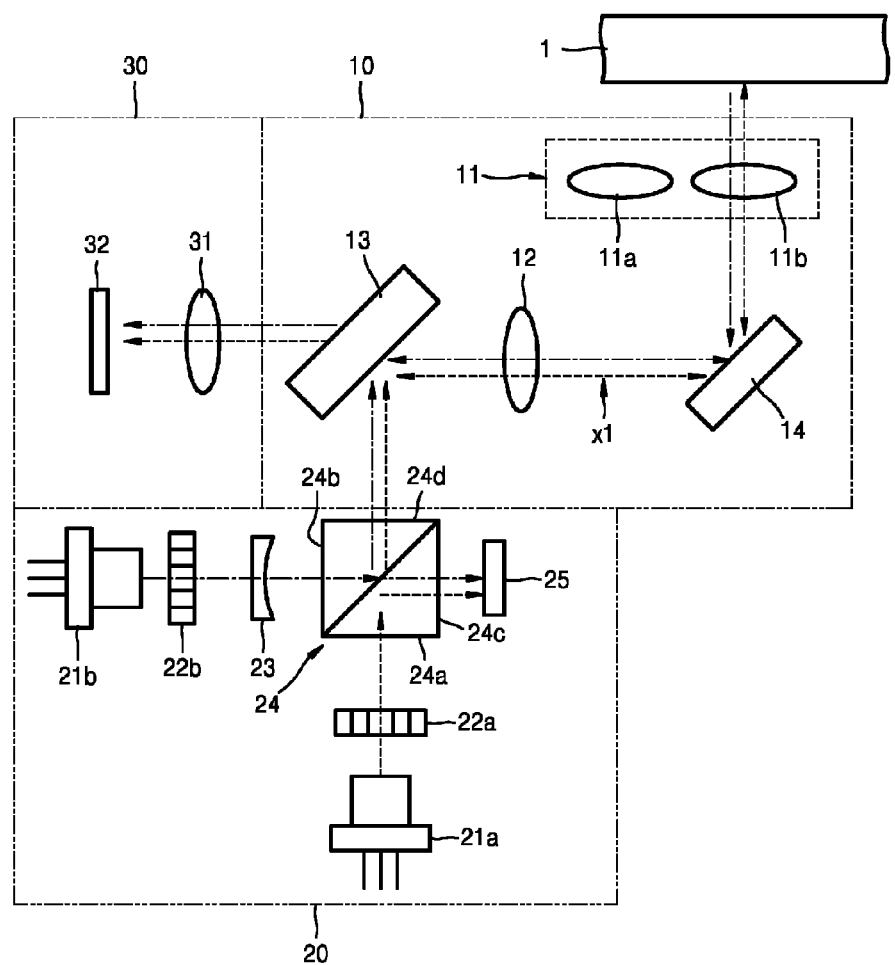
FIG. 1 is a schematic structure illustrating an example of a conventional optical pickup.

Throughout the drawings and the detailed description, unless otherwise described, the same drawing reference numerals will be understood to refer to the same elements, features, and structures. The relative size and depiction of these elements may be exaggerated for clarity, illustration and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, descriptions of well-known functions and constructions may be omitted for increased clarity and conciseness.

In the description below, features of the above-described optical system of FIG. 1 may be employed. For example in the light emitting system 20, different light sources are used for CDs/DVDs and BDs, and the second beam splitter 24 and the monitor photodetector 25 are shared by CD/DVD and BD optical systems. In addition, one first beam splitter 13 is shared even in the light transport system 10. However, in the description below, even though externally, all elements of the light receiving system 30 may be shared by all mediums, internally, different light receiving sensors may be used according to the type of the mediums. In the description below, some of sectors of regions of the light receiving sensors may be used for various mediums.

Hereinafter, a photodetector may include at least two light receiving sensors corresponding to a plurality of mediums, wherein each light receiving sensor includes a plurality of regions, each of which includes a plurality of sectors.

Figure 2A:
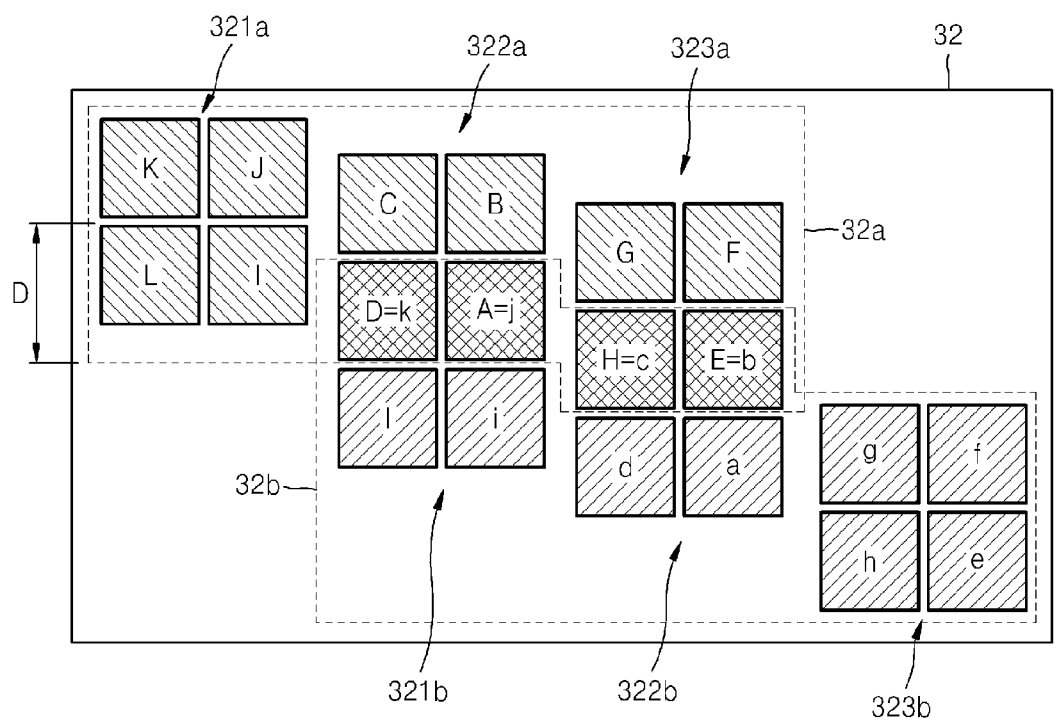
FIG. 2A is a diagram illustrating an example of a photodetector.
Figure 2B:
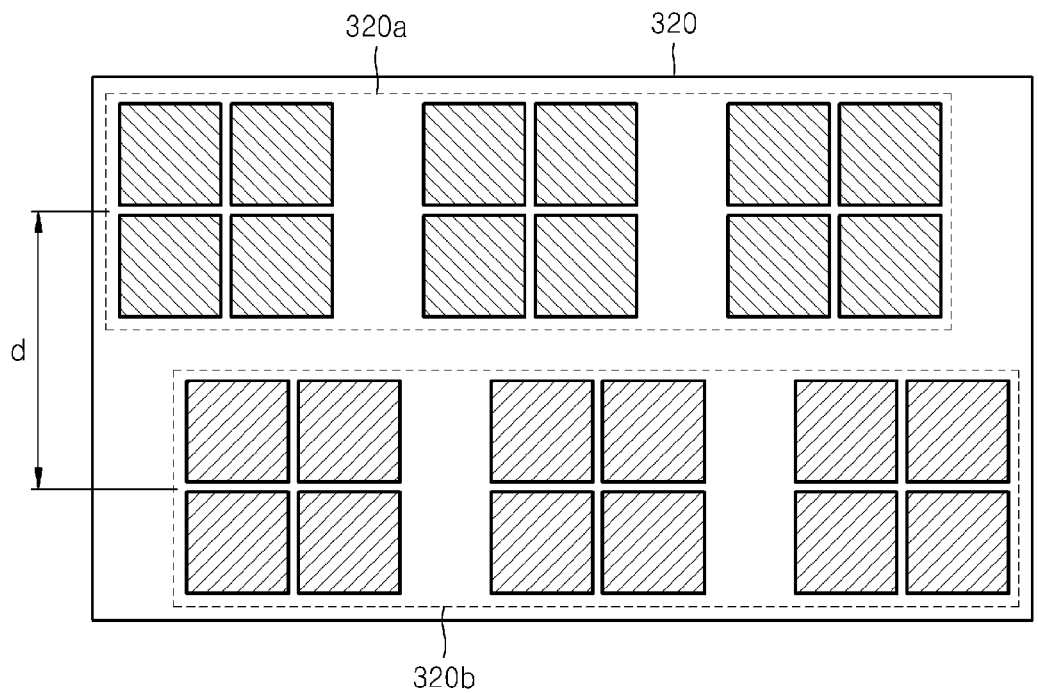
FIG. 2B is a diagram illustrating an example of a photodetector of a conventional optical pickup.

FIG. 2A illustrates an example of a photodetector 32, and FIG. 2B illustrates a photodetector of a conventional optical pickup.

Referring to FIG. 2A, the photodetector 32 has a unique sector alignment. A photodetection region includes 4 regions, each of which includes a plurality of sectors.

Two central regions respectively include six sectors (C, B, D=k, A=j, I, i) and (G, F, H=c, E=b, d, a), and two outer regions respectively include four sectors (K, J, L, I) and (g, f, h, e). That is, some of the regions have some sectors (D=k, A=j, H=c, E=b) shared by a first light receiving sensor 32a and a second light receiving sensor 32b for use with different mediums. In addition, these shared sectors (D=k, A=j, H=c, and E=b) are arranged to be close to sectors (C, B)(I, i)(G, F)(d, a), which may be exclusively used by the first or second light receiving sensors 32a and 32b to form multi-partitioned light receiving regions.

For comparison, a conventional photodetector is shown in FIG. 2B. For example, the conventional photodetector includes a first light receiving sensor 320a for DVDs/BDs and a second light receiving sensor 320b for CDs that are completely independently aligned spaced apart from each other by an appropriate interval (or pitch) d.

However, in the photodetector 32 according to the example shown in FIG. 2A, two regions of each of the first light receiving sensor 32a for DVDs/BDs and the second light receiving sensor 32b for CDs share some sectors.

In other words, each of the first and second light receiving sensors 32a and 32b has three regions. Central regions 322a and 322b of each of the first and second light receiving sensors 32a and 32b are main regions for receiving main beams, and regions at sides of the central regions 322a and 322b are respectively first and second sub regions 321a and 323a and first and second sub regions 321b and 323b for receiving sub beams, that is, ±first order light.

In this regard, the main region 322a of the first light receiving sensor 32a and the first sub region 321b of the second light receiving sensor 32b share two central sectors (D=k and A=j). In this regard, the second sub region 323a of the first light receiving sensor 32a and the main region 322b of the second light receiving sensor 32b share two central sectors (H=c and E=b). That is, the first and second light receiving sensors 32a and 32b of the photodetector 32 according to one example may have a narrowed width (or pitch) D compared to the conventional light receiving sensors since the first light receiving sensor 32a and the second light receiving sensor 32b are aligned in such a way that some sectors overlap each other.

Figure 3A:
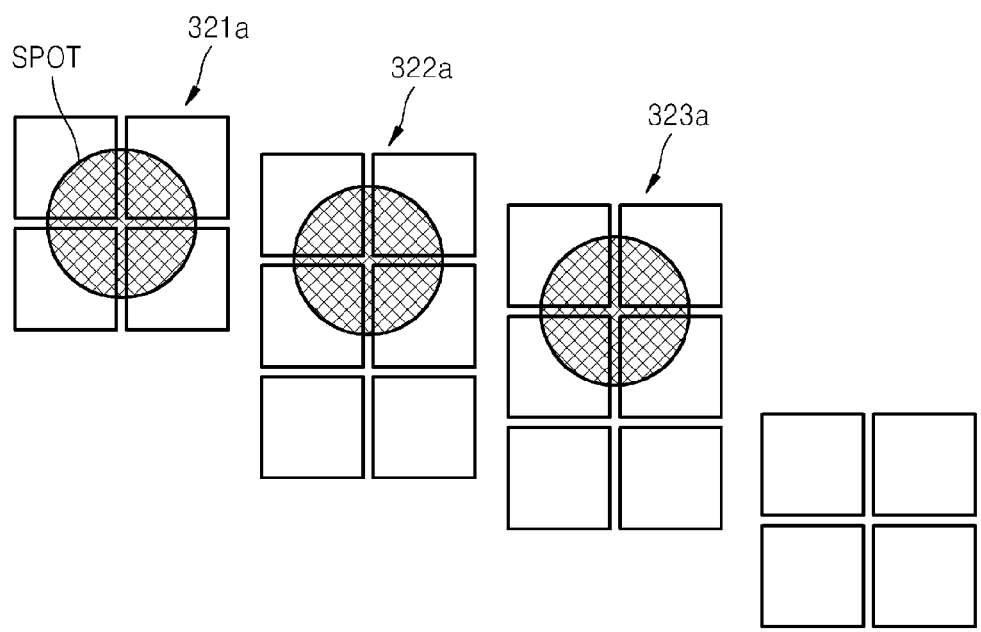
FIGS. 3A and 3B are diagrams illustrating examples regions used in a photodetector for different mediums.

Thus, when a medium is a DVD/BD, a main beam is received by the main region 322a including the sectors C, B, D=k, and A=j, and a first sub beam is received by the first sub region 321a including the sectors K, J, L, and I. In addition, a second sub beam is received by the second sub region 323a including the sectors G, F, H=c, and E=b. FIG. 3A illustrates examples of beam spots formed in the first light receiving sensor 32a used in the photodetector 32 when the medium is a DVD/BD.

Figure 3B:
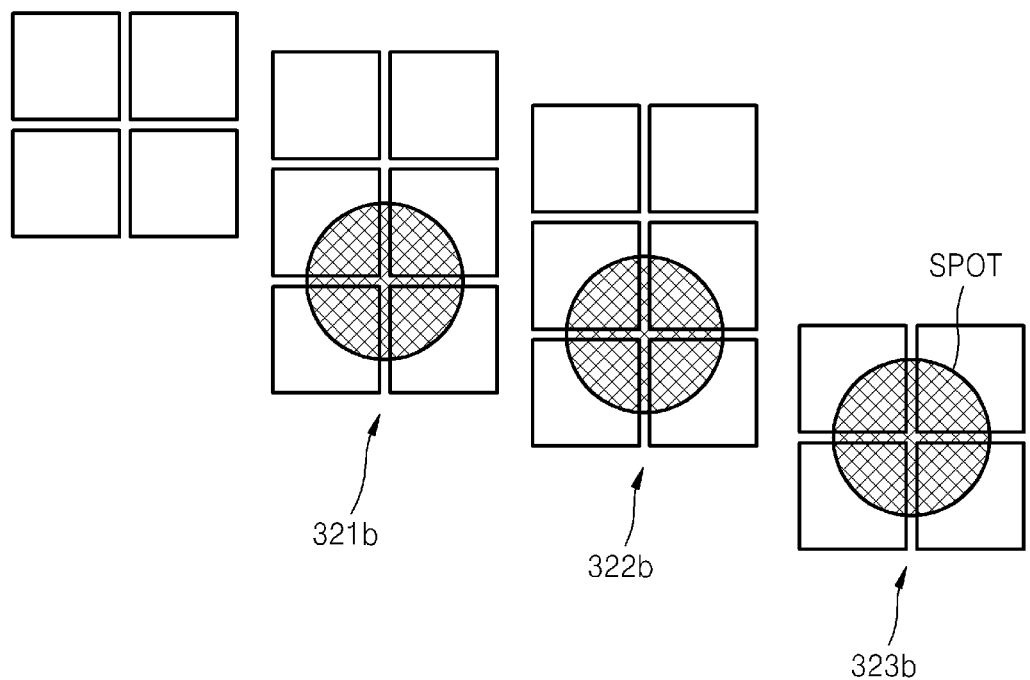

When the medium is a CD, a main beam is received by the main region 322b including the sectors H=c, E=b, d, and a, and a first sub beam is received by the first sub region 321b including the sectors D=k, A=j, I and i. In addition, the second sub beam is received by the second sub region 323b including the sectors g, f, h, and e. FIG. 3B shows examples of beam spots formed in the second light receiving sensor 32b used in the photodetector 32 when the medium is a CD.

A width of the photodetector 32 having the structure as described above is greater than a width the conventional photodetector in a transverse direction (i.e., in a direction in which three beams are aligned, in a left-right direction) but a height of the photodetector 32 is less than a height of the conventional photodetector in a longitudinal direction (i.e., in an up-down direction). As such, if the width (or pitch) D between the first light receiving sensor 32a and the second light receiving sensor 32b decreases in the longitudinal direction, a gradient of a twin light source may be reduced. Accordingly, a thickness of an optical pickup having the twin light source may be reduced to prepare an ultra-thin optical pickup. Meanwhile, an interval between the main region and the sub regions of each light receiving sensor may be adjusted by the grating interval of the diffraction elements, and an off-set of the second light receiving sensor with respect to the first light receiving sensor in the transverse direction (i.e., in the direction in which three beams are aligned) may be controlled by various optical conditions. For example, the main region 322a of the first light receiving sensor 32a and one sub region of the second light receiving sensor 32b may be aligned at the same position in the transverse direction.

Hereinafter, the gradient of the twin light source and the thickness of the optical pickup according to the gradient are described with reference to a three-dimensional alignment of the optical pickup compatibly used with a plurality of mediums such as CDs, BDs, and DVDs.

FIG. 4 illustrates an example of a three-dimensional alignment of optical members of an optical pickup compatibly used with a plurality of mediums according to one example described herein, with respect to an axis in which a light beam proceeds. A planar alignment and structure thereof are described above with reference to FIG. 1.

A total reflection mirror 14a and a dichroic mirror 14b are respectively disposed below a first objective lens 11a corresponding to CDs/DVDs and a second objective lens 11b corresponding to BDs. The dichroic mirror 14b disposed below the second objective lens 11b for BDs reflects a blue light toward a BD, and a light for CDs/DVDs having a longer wavelength that the blue light is transmitted. In addition, the total reflection mirror 14a is disposed below the first objective lens 11a corresponding to CDs/DVDs reflects an incident light toward a CD/DVD. Meanwhile, the collimating lens 12, an optical path refracting mirror 14c, and a quarter-wave plate (QWP) 15 are disposed between the first beam splitter 13 and the dichroic mirror 14b.

As described above, the first beam splitter 13 transmits light reflected from the medium 1 toward the photodetector 32 and reflects light from the light emitting system 20, i.e., the first and second light sources 21a and 21b, toward the collimating lens 12.

In the light receiving system 30, the sensing lens 31 allows the light reflected from the medium 1 to be incident on the photodetector 32 within an appropriate spot size, and may be a semi-cylindrical lens having an infinite focus in a first direction and a limited focus in a second direction perpendicular to the first direction.

The light emitting system 20 includes a plurality of light sources corresponding to a plurality of mediums as described above, for example, the first light source 21a for CDs/DVDs and the second light source 21b for BDs. In this regard, the second light source 21b has a cylindrical body for emitting a short wavelength light. However, the first light source 21a is a twin light source in which a chip for CDs and a chip for DVDs are integrated and has a base similar to a rectangle. In an H/H type optical pickup that is not required to be slimmed, the first light source 21a may have a cylindrical base, such as that of the second light source 21b. However, in a slim optical pickup, the light sources may be slimmed to reduce the size of the optical pickup. The first light source 21a leans with respect to a reference axis (X-X'), i.e., a planar direction of the medium 1.

Referring to FIG. 4, a diagonal direction of the base (Y-Y') is perpendicular to the reference axis (X-X'). That is, a random line passing the chip for CDs and the chip for DVDs (a planar direction of a wafer on which emission chips are formed) leans with respect to the X-X' axis. The gradient allows a long axis of 3 oval beams to be aligned in a radially tangential direction of the medium 1, i.e., in a direction crossing a direction in which a track extends. The diagonal direction of the base may lean with respect to the X-X' axis. As described above, according to the gradient, the width or pitch between the first light receiving sensor 32a and the second light receiving sensor 32b varies, and a minimum height of the optical pickup varies by the length of the base along the long axis in the first light source 21a, i.e., the length of the diagonal line (Y-Y').

A height of the first light source 21a in the optical pickup may be reduced by decreasing the gradient. In addition, the gradient is reduced in order for the first light receiving sensor 32a and the second light receiving sensor 32b to share some sectors in consideration of the reduction in the pitch between the first and second light receiving sensors 32a and 32b. As a result, the height of the first light source 21a in the optical pickup may be significantly reduced, so that an ultra-slim optical pickup may be obtained. As a result, while a thickness of a conventional slim optical pickup may be reduced to 5.6 mm, an ultra-thin optical pickup having a thickness of 3.8 mm may be obtained in the examples described above. In other words, the limitation of the gradient of the first light source 21a when the ultra slim optical pickup is prepared may be overcome by partially overlapping the sectors of the first light receiving sensor 32a and the sectors of the second light receiving sensor 32b to share some sectors in the photodetector 32.

Since the above-described optical pickup is a 3-beam type optical pickup, each light receiving sensor has three regions. However, the optical pickup may further include an additional light receiving sensor or each light receiving sensor may have an additional region in order to add an additional function.

In addition, according to this example, the main region 322a of the first light receiving sensor 32a is overlapped with one sub region of the second light receiving sensor 32b in the transverse direction, and the other sub region of the first light receiving sensor 32a is overlapped with the main region 322b of the second light receiving sensor 32b. However, according to another example, the regions of the first and the second light receiving sensors 32a and 32b that overlap in the transverse direction may be changed.

Figure 5:
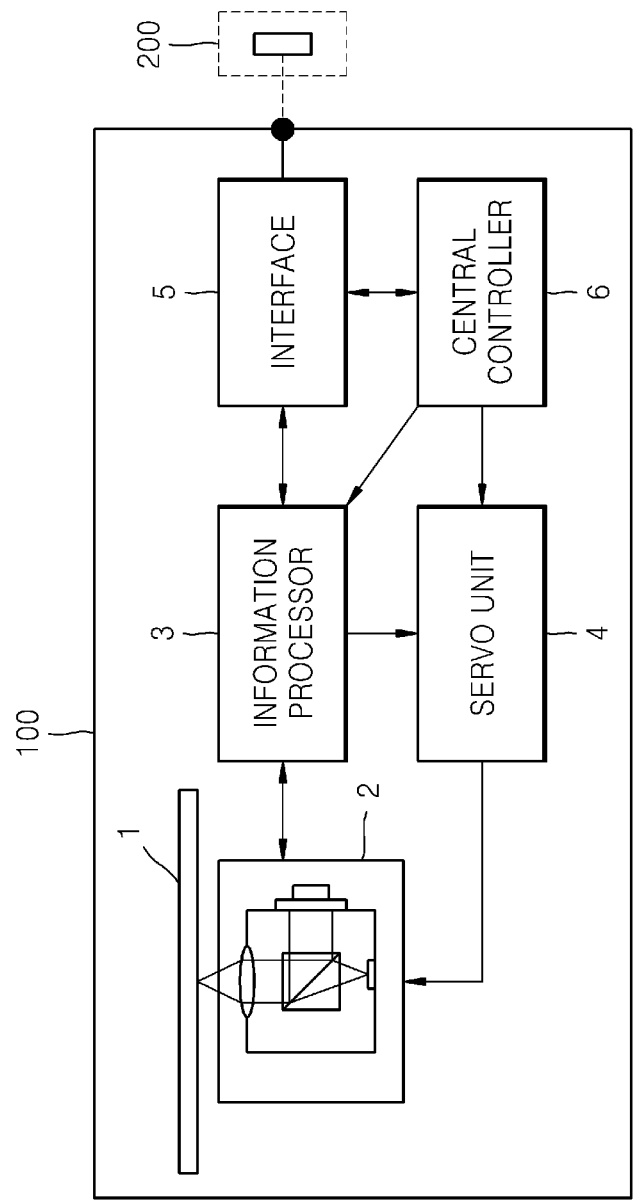
FIG. 5 is a diagram schematically illustrating an example of an optical drive adopting an optical pickup.

FIG. 5 illustrates an example of an optical drive 100 adopting an optical pickup.

The optical drive 100 that reads information from a medium 1 or writes information to the medium 1 includes an optical pickup 2 according to one or more embodiments as described above. The optical pickup 2 includes an optical system as described above and a mechanical system that sustains the optical system and performs focusing and tracking operations. The optical system that includes an encoder/decoder is connected to an information processor 3 connected to an interface 5 to be connected to an external host, and the mechanical system is connected to a servo unit 4. The information processor 3, the servo unit 4, and the interface 5 are controlled by a central controller 6. The interface 5 follows various standards. For example, the interface 5 includes a USB port. Thus, the interface 5 is connected to a host, e.g., a computer 200, by a USB protocol to send and receive information.

The photodetector may be implemented, as nonlimiting examples only, as a detector, a photosensor, a pinned photodiode, a p-n junction photodiode, a Schottky photodiode, a photogate, or any other suitable photoconversion device or device that may accumulate and/or store photocharges.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An optical pickup, comprising:
a light emitting system comprising a plurality of light sources corresponding to a plurality of media; and
a light receiving system comprising a photodetector configured to convert light reflected from a medium into an electrical signal, the photodetector comprising a first light receiving sensor corresponding to a first medium and a second light receiving sensor corresponding to a second medium, each of the first and second light receiving sensors comprising a plurality of regions, each region comprising a plurality of sectors, the plurality of regions of the first and second light receiving sensors comprising:
shared sectors configured to be shared by the first and second light receiving sensors; and
exclusive sectors configured to be exclusively used in the first light receiving sensor or the second light receiving sensor,
wherein at least one of the plurality of regions comprises one of the shared sectors and one of the exclusive sectors.

2. The optical pickup of claim 1, wherein the first and second light receiving sensors respectively comprise:
a main region configured to receive a main beam from one of the light sources; and
sub regions configured to receive sub beams, the sub regions being disposed at opposite sides of the main region.

3. The optical pickup of claim 2, wherein:
the first and second light receiving sensors respectively comprise three regions; and
two of the three regions comprise the shared sectors and exclusive sectors.

4. The optical pickup of claim 1, wherein:
each of the first and second light receiving sensors comprises a main region and first and second sub regions at opposite sides of the main region;
the main region and the second sub region of the first light receiving sensor and the first sub region and the main region of the second light receiving sensor comprise the shared sectors; and
the first sub region of the first light receiving sensor and the second sub region of the second light receiving sensor are configured to be exclusively used for different mediums.

5. The optical pickup of claim 1, wherein the photodetector comprises:
two adjacent regions of six sectors comprising the shared sectors; and
two regions of four sectors that are disposed at opposite sides of the two light receiving regions and that respectively belong to the first and second light receiving sensors.

6. An optical drive, comprising:
an optical pickup comprising:
an optical system; and
a mechanical system configured to:
sustain the optical system; and
perform focusing and tracking operations;
an information processor comprising an encoder/decoder, the information processor configured to process an electrical signal received from the optical pickup, the optical pickup comprising:
a light emitting system comprising a plurality of light sources corresponding to a plurality of media; and
a light receiving system comprising a photodetector configured to convert light reflected from a medium into an electrical signal, the photodetector comprising a first light receiving sensor corresponding to a first medium and a second light receiving sensor corresponding to a second medium, each of the first and second light receiving sensors comprising a plurality of regions, each region comprising a plurality of sectors, the plurality of regions of the first and second light receiving sensors comprising:
shared sectors configured to be shared by the first and second light receiving sensors; and
exclusive sectors configured to be exclusively used in the first light receiving sensor or the second light receiving sensor; and
a servo unit connected to the mechanical system,
wherein at least one of the plurality of regions comprises one of the shared sectors and one of the exclusive sectors.

7. The optical drive of claim 6, wherein the first and second light receiving sensors respectively comprise:
a main region configured to receive a main beam from one of the light sources; and
sub regions configured to receive sub beams, the sub regions being disposed at opposite sides of the main region.

8. The optical drive of claim 7, wherein:
the first and second light receiving sensors respectively comprise three regions; and
two of the three regions comprise the shared sectors and exclusive sectors.

9. The optical drive of claim 6, wherein:
each of the first and second light receiving sensors comprises a main region and first and second sub regions at opposite sides of the main region;
the main region and the second sub region of the first light receiving sensor and the first sub region and the main region of the second light receiving sensor comprise the shared sectors; and
the first sub region of the first light receiving sensor and the second sub region of the second light receiving sensor are configured to be exclusively used for different mediums.

10. The optical drive of claim 6, wherein the photodetector comprises:
two adjacent regions of six sectors comprising the shared sectors; and
two regions of four sectors that are disposed at opposite sides of the two light receiving regions and that respectively belong to the first and second light receiving sensors.

11. A photodetector, comprising:
a first light receiving sensor corresponding to a first medium;
a second light receiving sensor corresponding to a second medium, each of the first and second light receiving sensors comprising a plurality of regions, each region comprising a plurality of sectors, the plurality of regions of the first and second light receiving sensors comprising:
shared sectors configured to be shared by the first and second light receiving sensors; and
exclusive sectors configured to be exclusively used in the first light receiving sensor or the second light receiving sensor, wherein at least one of the plurality of regions comprises one of the shared sectors and one of the exclusive sectors.

12. The photodetector of claim 11, wherein the first and second light receiving sensors respectively comprise:
a main region configured to receive a main beam from one of the light sources; and
sub regions configured to receive sub beams, the sub regions being disposed at opposite sides of the main region.

13. The photodetector of claim 12, wherein:
the first and second light receiving sensors respectively comprise three regions; and
two of the three regions comprise the shared sectors and exclusive sectors.

14. The photodetector of claim 11, wherein:
each of the first and second light receiving sensors comprises a main region and first and second sub regions at opposite sides of the main region;
the main region and the second sub region of the first light receiving sensor and the first sub region and the main region of the second light receiving sensor comprise the shared sectors; and
the first sub region of the first light receiving sensor and the second sub region of the second light receiving sensor are configured to be exclusively used for different mediums.

15. The photodetector of claim 11, wherein the photodetector comprises:
two adjacent regions of six sectors comprising the shared sectors; and
two regions of four sectors that are disposed at opposite sides of the two light receiving regions and that respectively belong to the first and second light receiving sensors.

16. The optical pickup of claim 1, wherein one of the plurality of regions comprises six sectors.

17. The optical drive of claim 6, wherein one of the plurality of regions comprises six sectors.

18. The photodetector of claim 11, wherein one of the plurality of regions comprises six sectors.

* * * * *